United States Patent [19]
Ellenbogen

[11] Patent Number: 5,660,548
[45] Date of Patent: Aug. 26, 1997

[54] METHOD FOR IMPROVING LETTER COMPOSING AND WRITING SKILLS

[76] Inventor: David M. Ellenbogen, 13 Witte Rd., Albany, N.Y. 12203

[21] Appl. No.: 705,704

[22] Filed: Aug. 30, 1996

Related U.S. Application Data

[62] Division of Ser. No. 553,193, Nov. 7, 1995, Pat. No. 5,551,878, which is a continuation of Ser. No. 237,688, May 4, 1994, abandoned.

[51] Int. Cl.⁶ .................................................. G09B 19/00
[52] U.S. Cl. ............................................ 434/167; 434/156
[58] Field of Search ..................................... 434/156, 162, 434/165, 167, 363, 428; 40/124.1; 283/45, 56, 61, 62, 66.1; 281/2, 5, 42, 38

[56] References Cited

U.S. PATENT DOCUMENTS

| | | |
|---|---|---|
| 296,404 | 4/1884 | Grant . |
| 645,614 | 3/1900 | Williams et al. . |
| 1,429,436 | 9/1922 | Kelly . |
| 1,481,402 | 1/1924 | Wetzel et al. . |
| 2,361,154 | 5/1944 | Schoolfield . |
| 2,669,789 | 12/1954 | Buell . |
| 2,728,997 | 1/1956 | Gross . |
| 2,862,309 | 12/1958 | Von Der Hellen ...................... 434/156 |
| 3,266,049 | 8/1966 | Parmenter ................................ 434/363 |
| 3,271,884 | 9/1966 | Roberson . |
| 3,871,115 | 3/1975 | Glass et al. . |
| 4,109,938 | 8/1978 | Mitchell et al. ........................... 283/43 |
| 4,722,554 | 2/1988 | Pettit ........................................ 434/433 |
| 4,960,382 | 10/1990 | Alford ..................................... 434/164 |
| 5,018,975 | 5/1991 | Todd ....................................... 434/128 |
| 5,090,733 | 2/1992 | Bussiere ..................................... 283/2 |
| 5,102,338 | 4/1992 | Kapiloff .................................. 434/162 |
| 5,197,884 | 3/1993 | Roemer, Jr. et al. ..................... 434/167 |
| 5,219,184 | 6/1993 | Wolf ................................... 40/124.1 X |
| 5,306,155 | 4/1994 | Koke ................................... 434/162 X |

FOREIGN PATENT DOCUMENTS

| | | | |
|---|---|---|---|
| 143823 | 6/1920 | United Kingdom ................... 434/167 |

OTHER PUBLICATIONS

Kaplan, E.; "Writing for the World of Work"; Educational Design, Inc.; pp. 24, 25, 31, 32, 92, 93 1989.
"Language Arts"; Visual Materials Incorporated, Redwood City CA, Item Nos. WL008 and WL008SM; (Catalog) (No Date Provided).
"Pruzzle" (Pruzzle No. 735), *Washington Daily News*, Jan. 7, 1969.
Jones et al., "Language–Exercises for Adults", 1995, p. 99.
Shea, "Contemporary's The Writing Stuff Shaping Sentences", 1985, pp. 41, 167.
Fox, "The Reading–Writing Connection", 1990, pp. 111–112.

*Primary Examiner*—Jeffrey A. Smith
*Attorney, Agent, or Firm*—Heslin & Rothenberg, P.C.

[57] ABSTRACT

Letter writing skills are improved through use of an associative letter writing template comprising stationery having distinct regions separable by perforations. One distinct region has an outline of a letter while another distinct region has a plurality of thematic markings. The thematic markings may include words grouped by sub-topic and/or illustrations relating to a common theme. An individual is instructed to refer to the thematic markings in composing and writing a textual body for the letter upon the outline.

14 Claims, 1 Drawing Sheet

METHOD FOR IMPROVING LETTER COMPOSING AND WRITING SKILLS

This application is a division of application Ser. No. 08/553,193 filed Nov. 7, 1995 which application is now: U.S. Pat. No. 5,55,878, which is a continuation of application Ser. No. 08/237,688, filed May 4, 1994, now abandoned.

TECHNICAL FIELD

The present invention relates to methods and articles to improve individual writing skills. More particularly, the present invention relates to methods and letter writing templates which help teach and improve letter writing skills.

BACKGROUND OF THE INVENTION

The ability and skill required to write a well organized and topical letter is often taken for granted by those who have mastered the written language. However, when analyzing the steps involved in writing even a short letter, it becomes apparent that it requires the application of a wide variety of writing and language skills. Thus, although individuals may have grasped the more basic concepts of the written language, such as simple grammar and sentence structure, this alone is not enough to enable them to write a well organized and topical letter. This is particularly true with novice writers, such as young children.

In order to draft a well written letter an individual must draw upon much more than basic grammar skills. In order to convey to another one's thoughts in a written letter it is necessary to have the vocabulary to describe the activities and events that one wishes to write about. It is therefore plain to see how a limited vocabulary can restrict the topics discussed in a letter. Moreover, spelling of these same terms may likewise pose a problem for many writers.

In addition, some individuals often find it difficult to think of suitable topics to write about. Often the anxiety associated with their uncertainty over what to write about can cause them to become distracted or uninterested in writing. Similarly, many writers struggle with limited attention spans or an inability to focus on a single task. As a result their letters are often disorganized and tend to lack a consistent theme.

In addition to coping with limited language skills or attention spans, many writers also experience problems with physically writing a letter often individuals may find it difficult to write legibly or to do so in a straight line and a consistent size.

It is well known today that there exists a wide variety of stationery on which to write letters. It is possible to find stationery nowadays in many different colors, patterns and sizes. However, the existing stationery fails to deal with the problems experienced by many writers who have difficulty in writing a topical and well organized letter. The existing stationery fails to help the letter writer possessing a limited vocabulary, experiencing spelling difficulties or struggling over what to write about. Furthermore, the stationery available today further fails to keep a writer's attention or help them write a topical and well organized letter.

SUMMARY OF THE INVENTION

It is an object of the present invention to provide articles and methods which enable novice writers and other individuals to develop and improve their letter writing skills.

It is another object of the present invention to provide articles and methods which provide a variety of topics for a writer to choose from and write about. It is a further object of the invention to provide articles and methods which provide both a vocabulary and spelling list for the writer to draw upon in aid of their letter writing. It is yet another object of the present invention to provide articles and methods which act to enhance the writer's ability to write a legible letter, and improve their attention span as well as their ability to retain communication skills. It is a further object to provide articles and methods which facilitate the writing of topical and well organized letters.

These and other objects are achieved in accordance with the present invention by an associative letter writing template, comprising stationery having perforations therein forming first and second distinct regions separable along said perforations; wherein said first region has an outline of a letter thereon and said second region has a plurality of thematic markings thereon. These thematic markings may comprise words relating to a common theme and be arranged according to sub-topics.

The thematic markings may further comprise illustrations relating to this same theme. The thematic markings may alternatively comprise pictures related to a common theme. In addition, the first region may also further include illustrations relating to said common theme.

The present invention may also be practiced through a method of aiding letter writing which comprises the steps of: selecting a theme and words associated with said theme; providing an outline of a letter; providing a writing medium having first and second distinct sections; arranging the words upon the first distinct section preferably by sub-topic; arranging the outline upon the second distinct section; instructing an individual to refer to said thematic markings in writing a letter upon the outline; and separating said first region from said second region, whereby a more thematic and improved letter is obtained from said individual. This method may further comprise the additional steps of evaluating the content of the letter written by the individual, instructing on how to improve the written letter and delivering the written letter to an addressee.

The method may also comprise the step of providing illustrations relating to said theme on at least one of said first and second distinct sections.

In another aspect, the present invention contemplates a method of aiding letter writing comprising the steps of: selecting a theme; selecting and displaying thematic markings associated with said theme; displaying an outline of a letter; instructing an individual to refer to the displayed markings in preparing a letter on the displayed outline; and separating a letter prepared on the displayed outline from the displayed markings.

The present invention may also be practiced through a method of aiding a letter writer which comprises the steps of: selecting a theme and then selecting words and a picture associated with said theme, arranging and displaying the words so that they create a visual impression of the chosen picture, displaying an outline of a letter and instructing an individual to refer to the displayed visual impression in preparing a letter on the displayed outline.

DETAILED DESCRIPTION OF INVENTION

Figure 1:
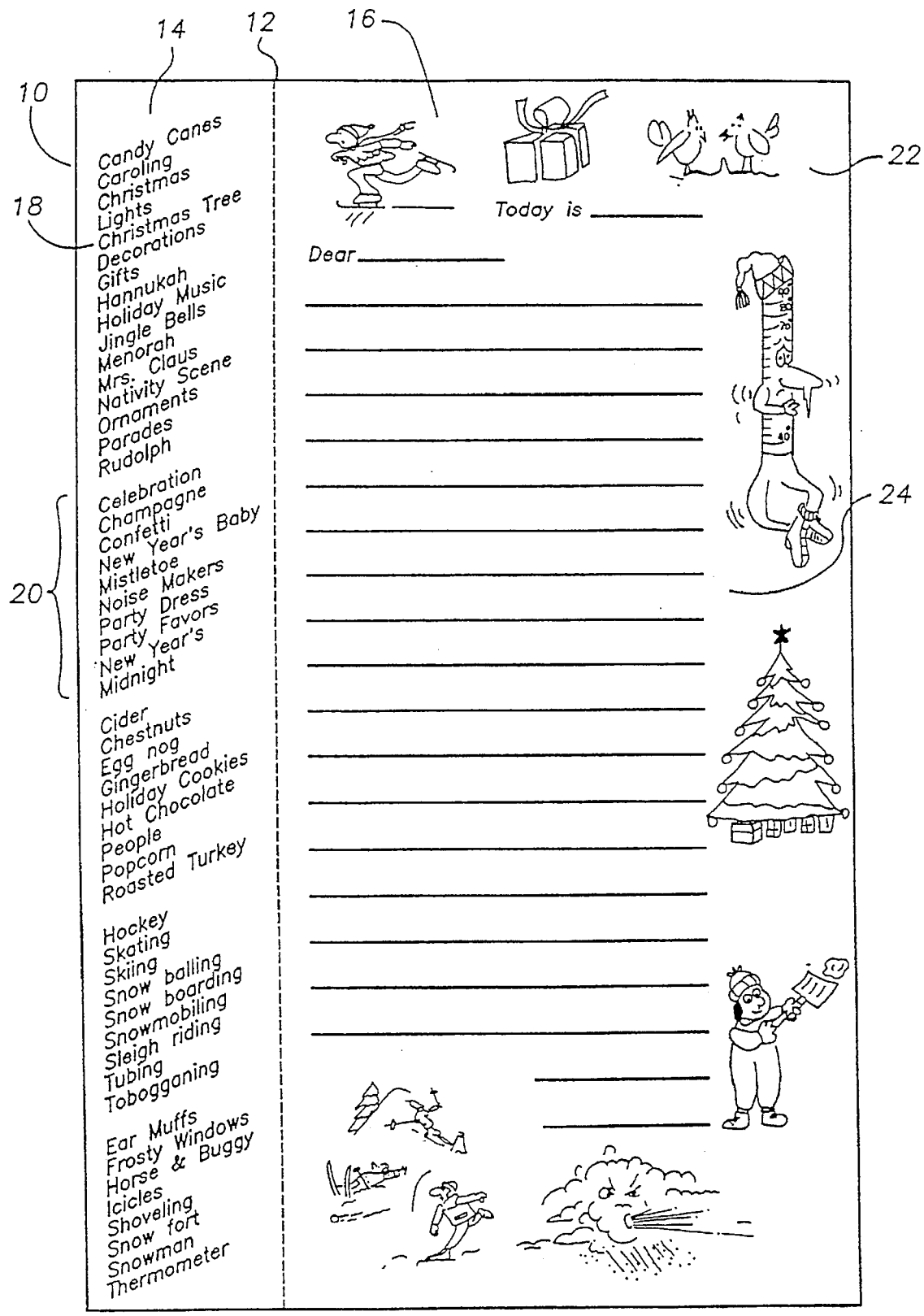
FIG. 1 is a plan view of a letter-writing template according to the present invention.

The present invention contemplates a letter-writing template, which generally comprises writing paper which has a series of perforations such that the perforations form distinct regions within the paper. At least one of the distinct regions has a collection of words or other markings relating to a chosen theme and another distinct region which contains a skeletal outline of a letter. These distinct regions are located on the letter-writing template such that they may be separated along the perforations.

An exemplary letter-writing template 10 is illustrated in FIG. 1. Template 10 is intended to enable an individual to write a letter and as such may comprise any commonly used writing medium. Preferably, and as is most common with letter stationery, the template 10 may be made out of an appropriate grade of paper. The template 10 should be sized so as to be capable of containing a letter, a collection of associative words or other thematic markings and optionally related illustrations. However, the specific size, color, shape and other characteristics of the template 10 may take on any of innumerable forms limited only by the parameters set forth below.

Within the letter writing template 10 there exist at least one series of perforations 12. It is preferred that the perforations run uninterrupted from one edge of the template 10 to a second non-adjacent edge and that the perforations run substantially in a straight line parallel to an outer edge of the template 10. This particular configuration can be seen in FIG. 1. The nature of the perforations utilized and necessary to enable manual separation of the distinct regions from one another is well known in the art and will depend on a variety of characteristics such as the type of paper utilized, the size of the perforations, the size and grade of the materials used, the dexterity of the individuals intended to use the template and other factors.

The perforations divide the template 10 into two distinct regions, namely the associative region 14 and letter region 16. The term 'distinct regions' as used herein means regions that do not have overlapping territory and whose only common edge is along the perforations within the template. It is similarly preferred that the perforations 12 be placed within template 10 such that, upon separating the distinct regions, the letter region 16 takes on a shape and size suited to be easily folded to fit in a standard envelope. Thus, it is preferred that upon separating the letter region 16 from other distinct regions that the letter region 16 has a substantially rectangular shape of size 6×9 in.

Still referring to FIG. 1 it can be seen that the perforations 12 divide the template 10 into at least two distinct regions, thereby forming an associative region 14 and the letter region 16. Template 10 is designed to encompass an overall theme and provide mental prompts or triggers, and spelling assistance for the letter writer. This is accomplished in part by the association region 14 with its collection of thematic markings. Although this region acts to aid the writer in the development of the letter it is not intended to remain attached to the letter region 16 or be sent to the addressee. Therefore, the associative region 14 may encompass any one of innumerable shapes although it is likewise preferred to have a rectangular shape and be sized to hold selected associative words 18 or other thematic markings and also facilitate ready separation of this region from the letter region 16.

The associative section 14 contains a listing of thematic markings, such as words 18, drawings 22, pictures, or other representations relating to the chosen theme of the template, e.g. winter. It is preferred that when the thematic markings comprise mainly words 18 that they be broken up into sub-topics and displayed on the associative region 14 in groups. As can be seen in the embodiment shown in FIG. 1, the words 18 are vertically arranged with the words of each sub-topic 20 further grouped in blocks. However, the selected words 18 may be listed or arranged in any logical or straightforward manner such as alphabetical, topical, random or arranged so as to create a distinct visual impression related to the chosen theme such as an outline of a skater. Although the specific arrangement of the same will depend in part upon the shape and size of the associative region 14 it will also depend on the number of sub-topics and words desired to be inserted therein. In addition to or instead of the listing of the topical words it is possible to display other thematic markings such as symbols, illustrations, drawings, photographs or graphical representations of activities, articles and events associated with the chosen theme.

Adjacent the associative region 14 is the letter region 16. This region may likewise contain thematic markings, e.g. a series of peripheral illustrations 22 associated with the chosen theme of the template 10. Illustrations 22 may be of a humorous nature to help attract and retain the writer's interest. In addition to the illustrations 22, a skeletal outline 24 of a letter is provided thereon. This skeletal outline 24 may merely comprise the lines on which to write the letter. However, it is preferred that the skeletal outline 24 be printed such that the lines indicate the desired location and size of not only the body of the letter but the heading and closing as well. Furthermore, it is similarly preferred that the outline further include additional prompts to indicate to the writer where the date, addressee's name, signature and the like should be inserted within the letter. Examples of such prompts can be seen in FIG. 1. Although it is not necessary that the skeletal outline 24 take on the standard letter format it is preferred since this will help teach novice letter writers to use accepted letter writing formats. FIG. 1 is but one embodiment and will be evident to one skilled in the art that there exist numerous variations and arrangements of the outline 24 and the illustration 22 within the letter region 15.

The lines making up the skeletal outline 24 preferably have standard margins in order to help the writer produce a neat organized letter. However, both young and old writers often have difficulty writing within small margins and therefore these margins may also be expanded to help those struggling with their dexterity. In addition, the margins may further be marked to indicate the mid-point of spaces between lines to help young writers with differentiating between capital and small case letters.

The associative letter template can be advantageously employed in a method of aiding and improving letter writing. The first step of the method is to provide an associative letter template as described above. This may be accomplished by first selecting a general theme and a collection of words which relate to the theme. It is preferred that the theme and words selected cover topics, activities and events appropriate for discussion in a letter and which are commonly experienced by the individuals intended to use the template. The selection of such themes will help the individual writer more easily think of specific events or topics that they are familiar with and wish to write about. There exist many different available themes and an even larger combination of thematic markings, such as words, to accompany a given theme.

The selected collection of words may also be broken up by sub-topic. For example, if the theme selected is winter, the collection of words may be further segmented by topics such as foods, holiday, weather, winter activities, etc. Once the collection of words has been determined, they may then be arranged as desired and displayed on the associative section 14 of the letter writing template 10.

As with selection of the associative words above, once a theme has been chosen, other thematic markings may be provided, such as various illustrations 22. These illustrations may include drawings, photographs, sketches or other visual representations of activities, articles and events which likewise relate to the chosen theme. It is preferred that the illustrations have a somewhat humorous tone, especially when the associative letter writing template is to be used by young children. Such lighthearted illustrations will help keep the young writer's attention and also help them select a topic that they truly wish to write about. These illustrations may take on a variety of colors, shapes and sizes although they should not be so large as to prevent the placement of the skeletal outline on the letter region. In addition, it should be noted that the illustrations may also be, or even alternatively be, placed within the associative region.

The letter region will also contain the skeletal outline. Once the specific format of the outline is chosen, it may likewise be displayed on the letter writing section along with the desired illustrations. However, the skeletal outline and the associative words should be displayed on distinct regions of the template.

Once the specific form of the letter writing template has been selected and provided, it may then be made available to an individual who wishes to write a letter. When teaching individuals how to write a letter, the template may likewise be given to the individuals who are then instructed in letter writing techniques. After the letter is written, the instructor may review the letter and explain to the writer how to write an improved letter by discussing its particular strengths and weaknesses. Thereafter, the associative regions may be separated from the letter region and the letter may be delivered to the addressee.

The present method of aiding letter writing may also be readily practiced with the aid of a computer. A skeletal outline of a letter may be provided upon a section of the screen along with the collection of associative words and illustrations. Upon printing, associative regions are separated from the letter region and not actually printed.

The unique combination of the individual elements of the present invention provide for various methods and letter writing templates which act to help an individual find topics to write about, provide potential vocabulary and spelling references for the individual which broaden the scope of the topics available to the writer. The skeletal format helps improve the legibility of the letter and together all of the elements help the writer produce a more cogent, thematic and organized letter. The associative regions may be separated from the written letter allowing the writer to send the improved letter to the addressee without revealing the associative aids.

Although the invention has been described with reference to specific embodiments it will be apparent to those skilled in the art that various modifications and alterations may be made without departing from the spirit of the invention, the scope of which is defined by the claims appended hereto.

What is claimed is:

1. A method of aiding correspondence letter composing and writing comprising the steps of:
   providing an associative letter writing template including:
      stationery having perforations therein forming first and second distinct regions separable from one another along said perforations, said first region having a skeletal outline of a correspondence letter, and said second region having a plurality of thematic markings thereon;
   instructing an individual to refer to said thematic markings in composing and writing a textual body for a letter upon said outline; and
   separating said first region from said second region, whereby a more thematic and improved letter is composed and written by said individual.

2. The method of claim 1 comprising the additional steps of:
   evaluating the content of the letter written by said individual; and
   instructing said individual on how to improve the written letter.

3. The method of claim 1 further comprising the step of delivering the written letter to an addressee.

4. The method of claim 1, further comprising stimulating, with said thematic markings, said individual to compose and write said textual body to be well-organized and topical.

5. A method of aiding correspondence letter composing and writing comprising the steps of:
   selecting a theme;
   selecting words associated with said theme;
   providing a writing medium having first and second distinct sections;
   arranging the words upon the first distinct section;
   providing a skeletal outline of a correspondence letter upon said second distinct section;
   instructing an individual to refer to the words in composing and writing a textual body for a correspondence letter upon said outline;
   stimulating, with said words, said individual to compose and write said textual body to be well-organized and topical; and
   separating the first section from the second section.

6. The method of claim 5 further comprising the steps of evaluating the written letter and providing the evaluation to the writer.

7. The method of claim 6 further comprising the step of arranging the selected words by sub-topic upon the first distinct section.

8. The method of claim 5 further comprising the step of delivering said letter to an addressee.

9. The method of claim 5 further comprising the step of providing illustrations relating to said theme on at least one of said first and second distinct sections.

10. The method of claim 5 wherein said words further provide a vocabulary and spelling list for said individual to draw upon in composing and Writing said textual body.

11. The method of claim 10 wherein said skeletal outline includes a plurality of spaced parallel lines.

12. The method of claim 11 wherein said skeletal outline further includes lines indicating a location and a size of a heading and a closing of said correspondence letter.

13. A method of aiding correspondence letter composing and writing comprising the steps of:
   selecting a theme;
   selecting and displaying thematic markings associated with said theme;
   displaying a skeletal outline of a correspondence letter;
   instructing an individual to refer to the displayed markings in preparing and composing a textual body for a correspondence letter on the displayed outline; and
   separating a correspondence letter prepared and composed on the displayed outline from the displayed markings.

14. The method of claim 13 wherein said markings comprise words arranged by sub-topic.

* * * * *

UNITED STATES PATENT AND TRADEMARK OFFICE
CERTIFICATE OF CORRECTION

PATENT NO. : 5,660,548
DATED : August 26, 1997
INVENTOR(S) : David M. Ellenbogen It is certified that error appears in the above-identified patent and that said Letters Patent are hereby corrected as shown below:

Column 4, line 36      "and will" should read --and it will--.

Column 6, line 46      "Writing" should read --writing--.

Signed and Sealed this

Seventh Day of April, 1998

Attest:

Attesting Officer

BRUCE LEHMAN

Commissioner of Patents and Trademarks